Oct. 6, 1931.  A. S. CHESTON ET AL  1,825,713
VEHICLE SEAT
Filed March 3, 1928   2 Sheets-Sheet 1
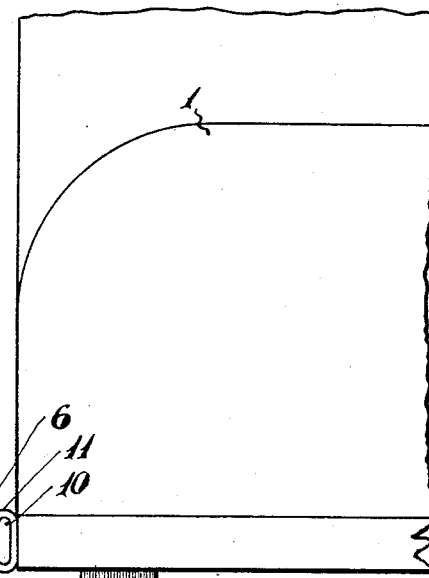
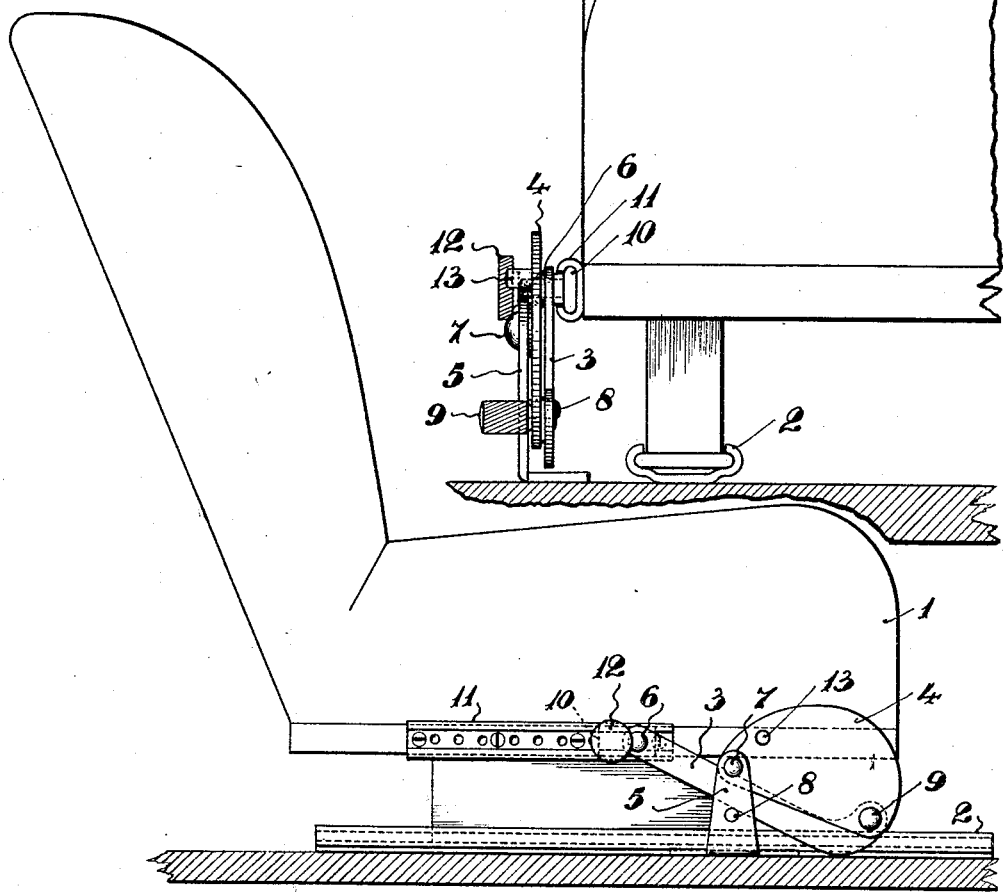

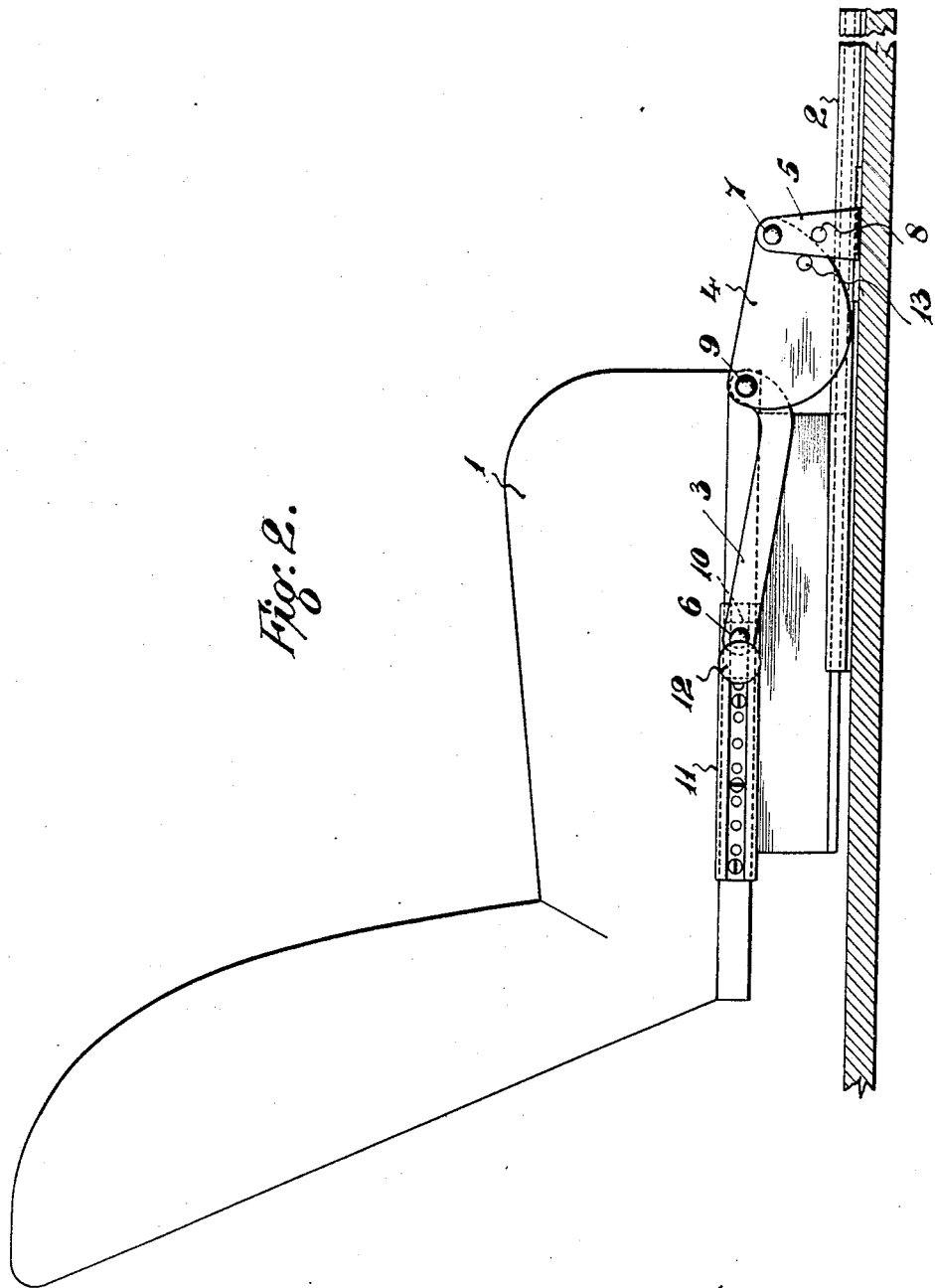

UNITED STATES PATENT OFFICE

ARTHUR SAM CHESTON, OF BIRMINGHAM, AND CHARLES COWARD AND CHARLES FRANK COWARD, OF MAIDENHEAD, ENGLAND

VEHICLE SEAT

Application filed March 3, 1928, Serial No. 258,794, and in Great Britain December 20, 1927.

This invention relates to seats for motor vehicles, particularly the front seats where the latter obstruct the doorway of the vehicle. The object of the present invention is to provide improved means for enabling the seat to be moved in a rearward direction, to allow of easy exit or entrance, the arrangement being such as to admit of the seat being always moved back into its original predetermined position, when required, without the necessity of having to determine this position afresh each time, the seat being automatically retained in such position so that it is effectively prevented from being accidentally displaced.

The invention consists in slidably mounting the seat, and in connecting it to the floor or other fixed part of the vehicle by means of links, arranged in such a manner that they serve positively to lock the seat when the said seat is in its normal forward position, the said links being adapted, when turned angularly, to cause the seat to move in a rearward direction. Two links pivoted together at their forward ends are preferably provided, the rear end of the one link being adjustably connected to the seat and the rear end of the other link being pivoted to a fixed member at a point disposed above the first link when the seat is in its forward position. The arrangement is such that movement of the seat in a rearward direction causes the links to move down against a suitable stop, while movement in the opposite direction is prevented by the pivots coming into alignment. The seat may, however, be readily moved rearwardly, when desired, by raising the forward ends of the links, so that they turn angularly relatively to one another. By connecting the one link to the seat, so that its point of attachment may be adjusted the position of the seat may be varied as desired, the improved arrangement insuring the seat being always moved up into the forward position determined upon.

Figure 1 of the accompanying drawings represents a side view of a seat having adjusting means constructed in accordance with this invention, the said seat being shown in its forward position.

Figure 2 shows the seat moved into its rearward position.

Figure 3 is a part sectional view, illustrating the manner in which one of the links is adjustably connected to the seat.

Referring to the drawings, the seat 1 is slidably mounted upon suitable guide-rails or runners 2 fixed to the vehicle floor, the said seat normally occupying a forward position (such as illustrated in Figure 1), and being adapted to be moved rearwardly along the rails, when required, into the position shown in Figure 2 so as to lie clear of the door of the vehicle and allow of a free or unrestricted entry or exit of the passengers. In order to admit of the forward position of the seat being adjusted, and to insure the seat being always moved back into, and automatically retained in, such predetermined forward position without the necessity of having to determine this position afresh each time, and in order to admit of the seat being readily moved rearwardly, a pair of pivoted-together links 3 and 4 are provided at the side of the seat, the link 3 being pivoted to the seat and the other link 4 (which may be shaped as shown) being pivoted to a fixed upstanding bracket 5. The said links are inclined to the horizontal, being pivoted together at their lower forward ends at 9, the link 3 being considerably longer than the other. This longer link 3 is pivotally connected to the seat 1 at its rear upper end at 6, while the rear end of the shorter link 4, on the other hand, is connected by a pivot 7 to the fixed bracket 5 which is secured to the floor of the vehicle, the arrangement being such that the pivot 7 lies just above the upper edge of the longer link 3 when the seat is in its normal forward position for use. The bracket 5 is disposed about midway between the ends of the longer link 3, and the pivoted forward extremity of the latter is slightly upwardly cranked while carried by the bracket 5 so as to engage the lower edge of the longer link 3 is a fixed pin 8 adapted to serve as a stop. The arrangement is such that an attempt to slide the seat in a rearward direction tends to cause the forward ends of the two links 3 and 4 to move downwardly, the shorter link 4 serving as a radius member, so that the lower edge of the longer link 3 binds or abuts against the fixed stop 8 on the bracket, any material rearward movement being thus positively prevented. On the other hand, if an attempt be made to slide the seat in the opposite direction, that is forwardly, the longer link 3 will cause the shorter link or radius member to move slightly upwards about its rear end until the three pivots 6, 7 and 9 move into alignment. Further movement of the seat is then effectively prevented, since it is impossible to move the shorter link 4 over the dead-center, the thrust acting in a direct line with the pivots. It will thus be seen that the seat 1 is positively prevented from being moved to any material extent in either direction, so that it cannot be inadvertently displaced. When, however, it is desired to move the seat rearwardly to lie clear of the doorway, this may be readily accomplished by raising the pivoted-together forward ends of the two links by hand. This will cause the links to move angularly relatively to one another and will enable the shorter link to be moved over the dead-center. Immediately the dead-center is passed the longer link 3 will move rearwardly, and will cause the seat to slide back along the guides 2 into the position illustrated in Figure 2, thus permitting of the free entry or exit of the passengers. The seat may be readily pushed back along the guides into its original forward position by hand when required, or it may be moved back by moving the forward ends of the links upwardly, the particular arrangement of the links preventing the seat from moving forward beyond its original predetermined position owing to the longer link again coming into engagement with the pin 8 on the bracket. To permit of the forward ends of the links being readily raised by hand, the pivot 9 connecting the said ends may be extended laterally to form a suitable knob or handle. (Figure 3.)

In order to allow of the normal forward position of the seat being varied, so that it may be set in the most convenient position, the rear end of the longer link 3 is connected to the seat in such a manner that the point of connection may be adjusted. For this purpose it is pivotally connected at 6 to a plate 10 slidably mounted within a horizontal guide or channel 11 fixed to the side of the seat. By allowing the plate to slide along the guide 11 the seat may set in the most suitable forward position, the plate 10 being then positively locked in place by a screw 12 passing through the plate and engaging the bottom of the guide, the links being positioned so that the longer link lies (as shown in Figure 1) below the pivot 7 connecting the shorter link 4 to the bracket 5. The guide 11 may have inturned flanges extending over the edges of the plate, while the bottom of the guide may have a series of spaced holes or recesses for engagement by the end of the screw for the purpose of giving a positive lock. The forward position of the seat may thus be adjusted as desired, the arrangement enabling the seat to be always moved up to such predetermined forward position without having to determine the position afresh each time.

Instead of the longer link 3 being arranged to engage a pin on the bracket, the seat may be prevented from being moved rearwardly by the forward end of the said longer link engaging against the vehicle floor; or any other suitable stop may be employed. A stop may be provided for limiting the rearward movement of the seat when the forward ends of the links 3 and 4 are raised by hand by a pin 13 on the shorter link 4 being arranged to engage the edge of the bracket when the seat has been moved back a sufficient distance. The longer link 3 may obviously be attached to any suitable part of the seat, or to a member fixed thereto, while a bracket of any suitable form may be provided; or a plate fixed to the side of the vehicle may take the place of the bracket.

The shorter link 4 is preferably shaped as shown so as to extend up above the lower edge of the seat 1 and prevent the fingers of the operator from being pinched. It may, however, obviously be of any other suitable shape. The links may be of any suitable length, and may be arranged in any desired manner provided they enable the seat to be always moved back into its original driving position so as automatically to retain it in the said position and prevent it from being displaced accidentally.

Having fully described our invention, what we desire to claim and secure by Letters Patent is:—

1. A vehicle seat, guides for slidably mounting the seat on the vehicle floor, a pair of links pivoted together at their forward ends, the one link being pivotally connected at its rear end to a fixed support, a guide upon the seat, a slide engaging and adjustable along the guide, means for pivotally connecting the rear end of the other link to the slide, means for locking the slide, and a stop adapted to engage one of the links, the latter serving to retain the seat in its normal forward position, and being adapted, by raising their outer ends, to allow the seat to move rearwardly.

2. A vehicle seat, guides for slidably mounting the seat on the vehicle floor, a normally downwardly inclined link, a guide channel on the side of the seat, a slide adjustable within the guide channel, means for locking the slide, a second link, a fixed upstanding bracket, means for pivotally connecting together the forward ends of the two links, means for pivoting the rear end of the second link to the bracket at a point normally above a line joining the pivots of the first link, and a stop on the bracket adapted to engage the first link, the links being adapted to retain the seat in its normal forward position, and being adapted, when their forward ends are raised to allow the seat to move rearwardly.

3. The combination with a vehicle seat, of means for slidably mounting it on a support, a pair of links pivoted together for relative angular movement and connecting the seat to a part on the vehicle independent of the seat, a slide to which one of the links is pivoted at its outer end, a longitudinal guide engaged by said slide, and means for fixing the slide in relation to the guide for varying the normal position of the seat, the links being adapted to be moved into forwardly extending locking positions overlapping one another with their pivots over a dead center so as to lock the seat in its normal forward position against rearward displacement until they are moved to the other side of the said dead center.

4. The combination with a vehicle seat, of means for slidably mounting it on a support, two links pivoted together for relative angular movement and connecting the seat to a part on the vehicle independent of the seat, a slide to which one of the links is pivoted at its outer end, a longitudinal guide engaged by said slide, means for fixing the slide in relation to the guide for varying the normal position of the seat, the links being adapted to be moved into forwardly extending locking positions overlapping one another with their pivots over a dead center so as to lock the seat in its normal forward position against rearward displacement until they are moved to the other side of the said dead center, and a stop for preventing the pivots of the links from being moved into a seat-locking position when the seat is slid rearwards after the links have been unlocked from their normal forward locking positions.

5. A vehicle seat, guides for slidably mounting the seat on the vehicle floor, a link, a guide channel, a slide adjustable within the guide channel and to which said link is connected, means for locking the slide, a second link, a bracket, means for pivotally connecting together certain ends of two links, means for pivoting the other end of the second link to said bracket at a point normally offset relative to a line joining the pivots of the first-mentioned link, and a stop on the bracket engageable by one of said links.

6. A vehicle seat, means for slidably mounting the seat on the vehicle floor, a pair of links pivotally connected at their ends, means for pivoting the free end of one of the links to the seat, a bracket fixed to the vehicle floor, means for pivoting the free end of the other link to said bracket, means on said bracket contacted by the first-mentioned link for limiting the rearward movement of the seat when said seat is in its forward position, and means carried by the second-mentioned link and contacting said bracket for limiting the rearward movement of said seat when the latter is in its rearward position.

7. A vehicle seat, means for slidably mounting the seat on the vehicle floor, a pair of links pivotally connected at their ends, means for pivoting the free end of one of the links to the seat, a bracket fixed to the vehicle floor, means for pivoting the free end of the other link to said bracket, and means on said bracket contacted by the first-mentioned link for limiting the rearward movement of the seat on the slide when said seat is in its forward position.

In testimony whereof we have affixed our signatures.

ARTHUR SAM CHESTON.
CHARLES COWARD.
CHARLES FRANK COWARD.